(12) United States Patent
Kang et al.

(10) Patent No.: US 11,276,526 B2
(45) Date of Patent: Mar. 15, 2022

(54) MULTILAYER CAPACITOR

(71) Applicant: SAMSUNG ELECTRO-MECHANICS CO., LTD., Suwon-si (KR)

(72) Inventors: So Ra Kang, Suwon-si (KR); Byeong Gyu Park, Suwon-si (KR); Jae Yeol Choi, Suwon-si (KR); Yong Jin Yun, Suwon-si (KR); Jung Min Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 112 days.

(21) Appl. No.: 16/521,301

(22) Filed: Jul. 24, 2019

(65) Prior Publication Data
US 2020/0075242 A1    Mar. 5, 2020

(30) Foreign Application Priority Data

Aug. 29, 2018 (KR) .................. 10-2018-0102002
Oct. 15, 2018 (KR) .................. 10-2018-0122623

(51) Int. Cl.
*H01G 4/012* (2006.01)
*H01G 4/248* (2006.01)
(Continued)

(52) U.S. Cl.
CPC .......... *H01G 4/012* (2013.01); *H01G 4/1227* (2013.01); *H01G 4/248* (2013.01); *H01G 4/30* (2013.01)

(58) Field of Classification Search
CPC .................. H01G 4/012; H01G 4/30
See application file for complete search history.

(56) References Cited

U.S. PATENT DOCUMENTS

| 2007/0211404 A1 | 9/2007 | Kojima et al. | |
| 2012/0147516 A1* | 6/2012 | Kim | H01G 4/30 361/301.4 |

(Continued)

FOREIGN PATENT DOCUMENTS

| JP | H11-297566 A | 10/1999 |
| JP | 2007-243040 A | 9/2007 |

(Continued)

OTHER PUBLICATIONS

Korean Office Action dated Sep. 20, 2019 issued in Korean Patent Application No. 10-2018-0122623 (with English translation).

*Primary Examiner* — Nathan Milakovich
(74) *Attorney, Agent, or Firm* — Morgan, Lewis & Bockius LLP

(57) ABSTRACT

A multilayer capacitor includes a body, a plurality of internal electrodes, and external electrodes. The corners of the cover portions of the body include curved surfaces, a length of each of internal electrodes disposed in the cover portions among the plurality of internal electrodes is smaller than a length of an internal electrode disposed in a central portion, and when a distance from a surface of the body to a closest internal electrode among the plurality of internal electrodes is defined as a margin, a portion of the margin region, located directly above or below the internal electrodes disposed in the cover portions in the stacking direction, includes at least two layers including different densities of dielectric layers.

20 Claims, 14 Drawing Sheets

(51) Int. Cl.
  *H01G 4/30* (2006.01)
  *H01G 4/12* (2006.01)

(56) References Cited

U.S. PATENT DOCUMENTS

| | | | |
|---|---|---|---|
| 2013/0222972 A1 | 8/2013 | Saito et al. | |
| 2014/0301012 A1* | 10/2014 | Kim | H01G 4/1209 |
| | | | 361/301.4 |
| 2015/0348712 A1* | 12/2015 | Lee | H01G 4/248 |
| | | | 174/260 |
| 2016/0196918 A1* | 7/2016 | Hong | H01G 4/232 |
| | | | 174/260 |
| 2017/0011852 A1* | 1/2017 | Miyazaki | H01G 4/30 |
| 2017/0040111 A1 | 2/2017 | Kim et al. | |
| 2017/0213647 A1 | 7/2017 | Ahn | |
| 2018/0182555 A1* | 6/2018 | Kowase | H01G 4/224 |
| 2019/0164693 A1* | 5/2019 | Ono | H01G 4/012 |
| 2020/0027661 A1* | 1/2020 | Park | H01G 2/065 |
| 2020/0075258 A1* | 3/2020 | Park | H01G 4/232 |
| 2020/0075259 A1* | 3/2020 | Park | H01G 4/30 |
| 2020/0075260 A1* | 3/2020 | Yun | H01G 4/232 |
| 2020/0152390 A1* | 5/2020 | Yeon | H01G 4/228 |
| 2020/0152391 A1* | 5/2020 | Kang | H01G 4/12 |
| 2020/0234880 A1* | 7/2020 | Kim | H01G 4/228 |
| 2020/0402717 A1* | 12/2020 | Lee | H01G 4/224 |
| 2021/0304969 A1* | 9/2021 | Ishii | H01G 4/30 |

FOREIGN PATENT DOCUMENTS

| | | |
|---|---|---|
| JP | 2011-3845 A | 1/2011 |
| KR | 10-2013-0087032 A | 8/2013 |
| KR | 10-2017-0007157 A | 1/2017 |
| KR | 10-1701049 B1 | 1/2017 |
| KR | 10-2017-0087665 A | 7/2017 |

* cited by examiner

MULTILAYER CAPACITOR

CROSS-REFERENCE TO RELATED APPLICATION(S)

This application claims the benefit of priority to Korean Patent Application No. 10-2018-0102002 filed on Aug. 29, 2018 and Korean Patent Application No. 10-2018-0122623 filed on Oct. 15, 2018 in the Korean Intellectual Property Office, the entire disclosures of which are incorporated herein by references.

TECHNICAL FIELD

The present disclosure relates to a multilayer capacitor.

BACKGROUND

A capacitor is a device which may store electrical power. In a capacitor, two electrodes may be configured to oppose each other such that when voltage is applied, electrical power may be accumulated in each electrode. When a direct current voltage is applied, electrical power may be stored and current may flow in the capacitor, and when the storing of electrical power is completed, current may not flow. When an alternating current is applied, polarities of the electrodes may be alternated and alternating current may flow.

Depending on a type of an insulator provided between electrodes, there may be various types of capacitors, such as an aluminum electrolytic capacitor including electrodes formed of aluminum and including a thin oxide film between the electrodes, a tantalum capacitor using tantalum as a material of electrodes, a ceramic capacitor in which a dielectric of a high dielectric constant such as barium titanium is used between electrodes, a multilayer ceramic capacitor (MLCC) using a multilayer structure of ceramic of a high dielectric constant as a dielectric provided between electrodes, a film capacitor using a polystyrene film as a dielectric between electrodes, and the like.

Among the different types of capacitors, a multilayer ceramic capacitor may have improved temperature properties and frequency properties, and may have a reduced size such that a multilayer ceramic capacitor has been increasingly applied in various fields such as a radio frequency circuit, and the like.

A general multilayer ceramic capacitor may include a stack body formed by stacking a plurality of dielectric sheets, external electrodes having different polarities may be disposed externally on the stack body, and internal electrodes alternately stacked in the stack body may be electrically connected to external electrodes, respectively.

As electronic products have been designed to have reduced sizes and high integration density, there has been a great volume of research into implementing a reduced size and high integration density in a multilayer ceramic capacitor. Particularly, to implement high capacitance and a reduced size in a multilayer ceramic capacitor, there have been various attempts to improve connectivity of internal electrodes by reducing a thickness of a dielectric layer and layering a higher number of dielectric layers.

Also, in the development of a multilayer ceramic capacitor having ultra-high capacitance, it has been more important to secure reliability of a product including thin dielectric layers and a higher number of internal electrodes stacked therein. The higher the number of the layers, the more a stepped portion formed by a difference between thicknesses of an internal electrode and a dielectric layer may further increase. Such a stepped portion may cause warpage of an end of an electrode due to the elongation of a dielectric layer in a lateral direction in a densification process for compressing a body.

An end of an internal electrode may be bent to fill the stepped portion, and an empty space of a margin portion formed by the stepped portion may be removed as a cover is recessed and a margin width is reduced. As the empty space formed by the stepped portion is removed, a capacitance layer may also be elongated by as much as the reduced margin width. Due to the irregular elongation of an internal electrode, reliability of a multilayer ceramic capacitor, such as withstand voltage properties, and the like, may degrade.

To address the issue described above, a method of cutting both side surfaces of a body formed in a length direction and attaching side surface margin portions have been developed, but the method may be complex, such that productivity may decrease, and when a thickness of the side surface margin portion is reduced, a thickness of a corner margin portion is also reduced at the same time such that moisture resistance reliability may be deteriorated.

SUMMARY

An aspect of the present disclosure is to provide a multilayer capacitor which may have an increased effective volume and may secure moisture resistance reliability.

According to an aspect of the present disclosure, a multilayer capacitor is provided, the multilayer capacitor including a body having a stack structure of a plurality of dielectric layers, and a plurality of internal electrodes stacked with each of the plurality of dielectric layers interposed therebetween, and external electrodes disposed in an external portion of the body and electrically connected to the plurality of internal electrodes. The body includes a central portion, and cover portions positioned in an upper portion and a lower portion of the central portion in a stacking direction of the plurality of the dielectric layers, the body includes a first surface and a second surface exposing the plurality of internal electrodes and opposing each other, a third surface and a fourth surface opposing each other in the stacking direction, and a fifth surface and a sixth surface connected to the first to fourth surfaces and opposing each other, corners of the cover portions of the body are curved, a length of each of internal electrodes disposed in the cover portions among the plurality of internal electrodes is smaller than a length of an internal electrode disposed in the central portion. When a distance from a surface of the body to a closest internal electrode among the plurality of internal electrodes is defined as a margin, a margin Wg of each of the fifth surface and the sixth surface and a margin Tg of each of the third surface and the fourth surface satisfy a condition of $0.8 \leq Tg/Wg \leq 1.2$.

Among the internal electrodes of the plurality of internal electrodes disposed in the cover portions, a length of an internal electrode closer to the third or fourth surface of the body is smaller than a length of an internal electrode farther from the third or fourth surface.

A length of each of the plurality of internal electrodes may be a length taken in a direction perpendicular to a direction connecting the first surface and the second surface and to the stacking direction.

Corners of the cover portions at which the third surface is connected to the fifth surface and the sixth surface and corners at which the fourth surface is connected to the fifth surface and the sixth surface may include curved surfaces.

A margin δ of each of the curved corners of the cover portions may be greater than or equal to a margin Wg of each of the fifth surface and the sixth surface, where a distance from a surface of the body to a closest internal electrode among the plurality of internal electrodes is defined as a margin.

δ and Wg may satisfy a condition of 1≤δ/Wg≤1.2.

Wg may satisfy a condition of 0.5 um≤Wg≤T/12.

A radius of curvature R of each of the curved corners of the cover portions and a thickness T of the body in the stacking direction may satisfy a condition of 10 um≤R≤T/4.

A virtual surface defined by connecting ends of the plurality of internal electrodes disposed in the cover portions of the body in the stacking direction may be a curved surface, and a radius of curvature of the curved surface may be the same as a radius of curvature of each of the curved corners of the cover portions.

A virtual surface defined by connecting ends of the plurality of internal electrodes disposed in the cover portions of the body in the stacking direction may be a curved surface, and a radius of curvature of the curved surface may be less than a radius of curvature of each of the curved corners of the cover portions.

When a distance from a surface of the body to a closest internal electrode among the plurality of internal electrodes is defined as a margin, a radius of curvature of each of the curved corners of the cover portions may be a sum of a radius of curvature of the virtual surface and a margin, δ, of the curved corner of the cover portions.

When an outer region of the body surrounding the plurality of internal electrodes is defined as a margin region, density of dielectric layers in the margin region may be less than density of dielectric layers in a remaining region of the body.

The margin region may include at least two layers including different densities of the dielectric layers, and density of the dielectric layer may be higher in a layer adjacent to the plurality of internal electrodes among the at least two layers.

The margin region may include a plurality of needle-type pores.

The plurality of needle-type pores may be aligned in a shape corresponding to an exterior shape of the body.

The plurality of needle-type pores may be composed of a plurality of rows when each row is a form in which the plurality of needle-type pores are aligned in the shape corresponding to the exterior shape of the body.

Pore densities of the plurality of rows may be different from one another, and a pore density of a region closer to an outer surface of the body is lower than densities of other regions in the plurality of rows.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
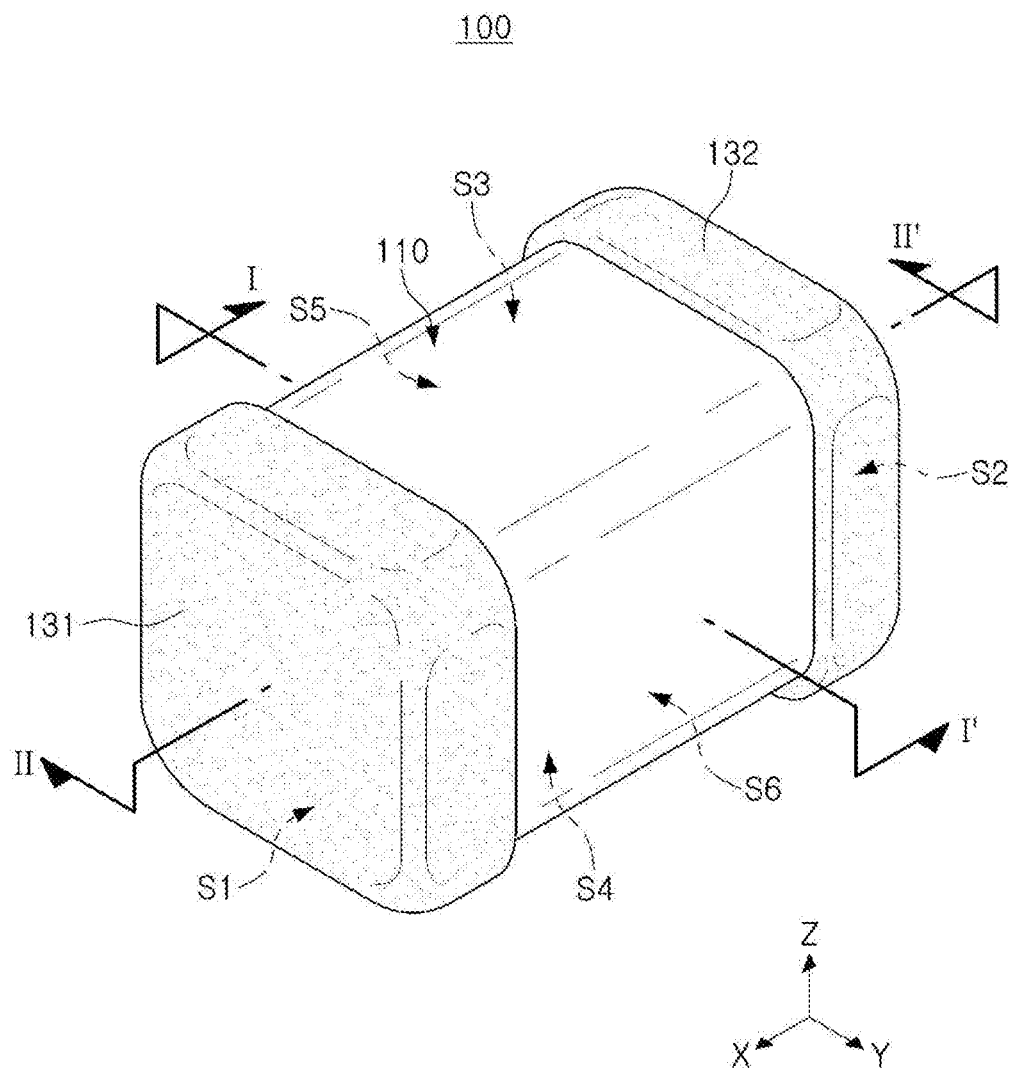
FIG. 1 is a perspective diagram illustrating an exterior of a multilayer capacitor according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numeral.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numeral. Further, throughout the specification, it will be understood that when a part "includes" an element, it can further include another element, not excluding another element, unless otherwise indicated.

Figure 2:
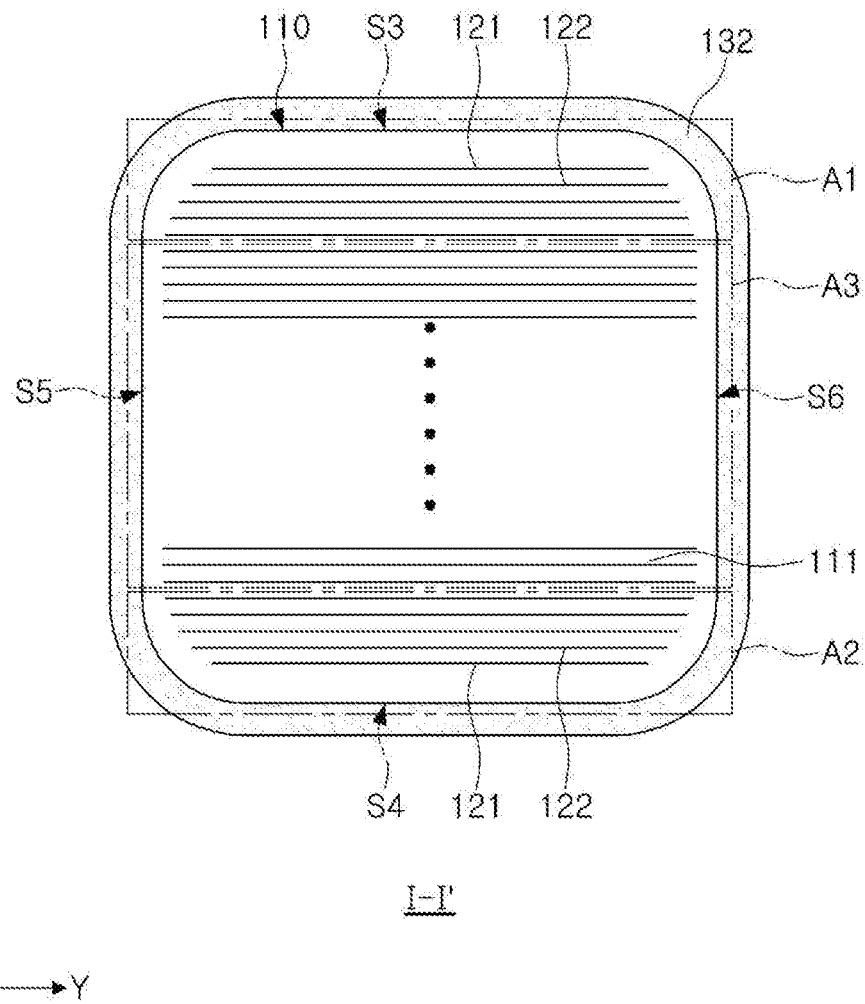
FIGS. 2 and 4 are cross-sectional diagrams illustrating a multilayer capacitor taken along line I-I' in FIG. 1, and in FIG. 4, an outline of a region in which an internal electrode is disposed is marked by a dotted line.
Figure 3:
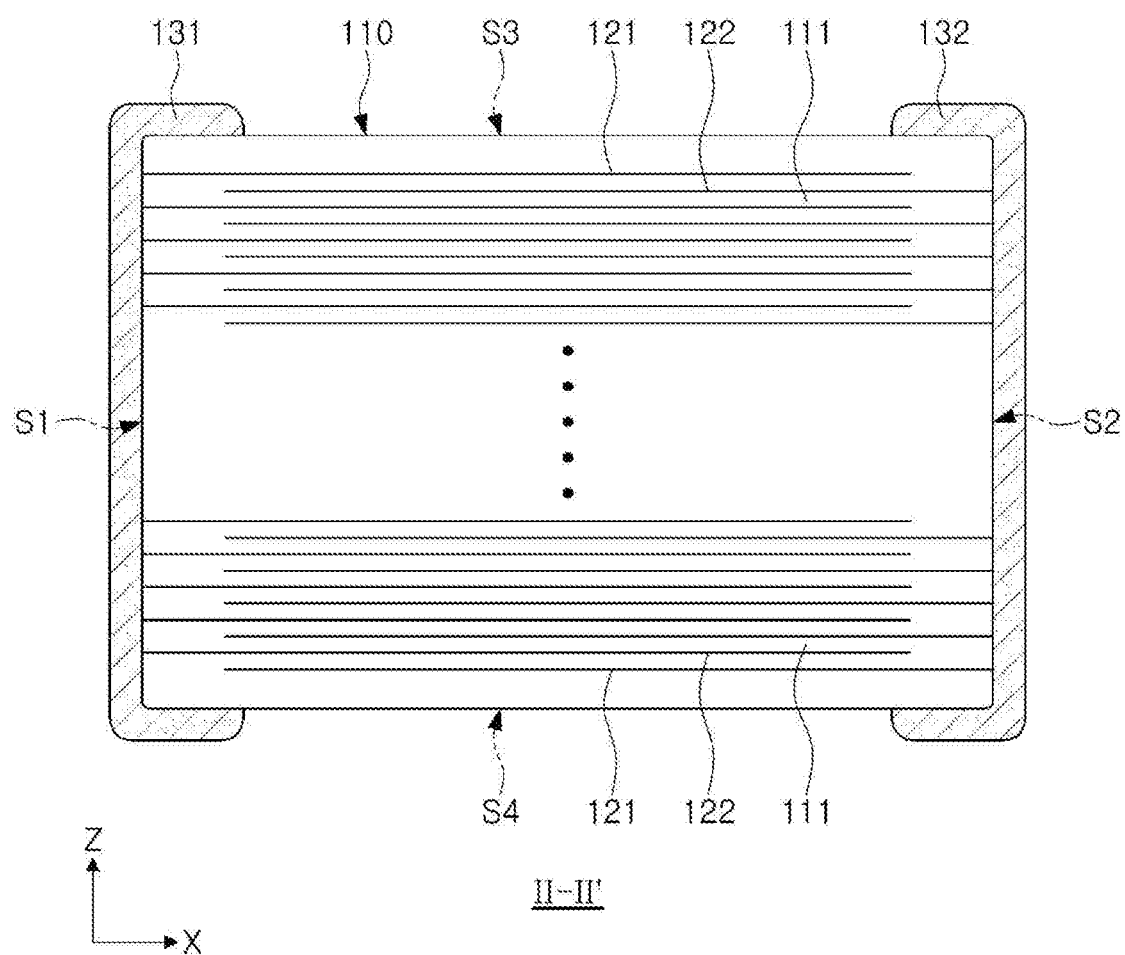
FIG. 3 is a cross-sectional diagram illustrating a multilayer capacitor taken along line II-II' in FIG. 1.
Figure 4:
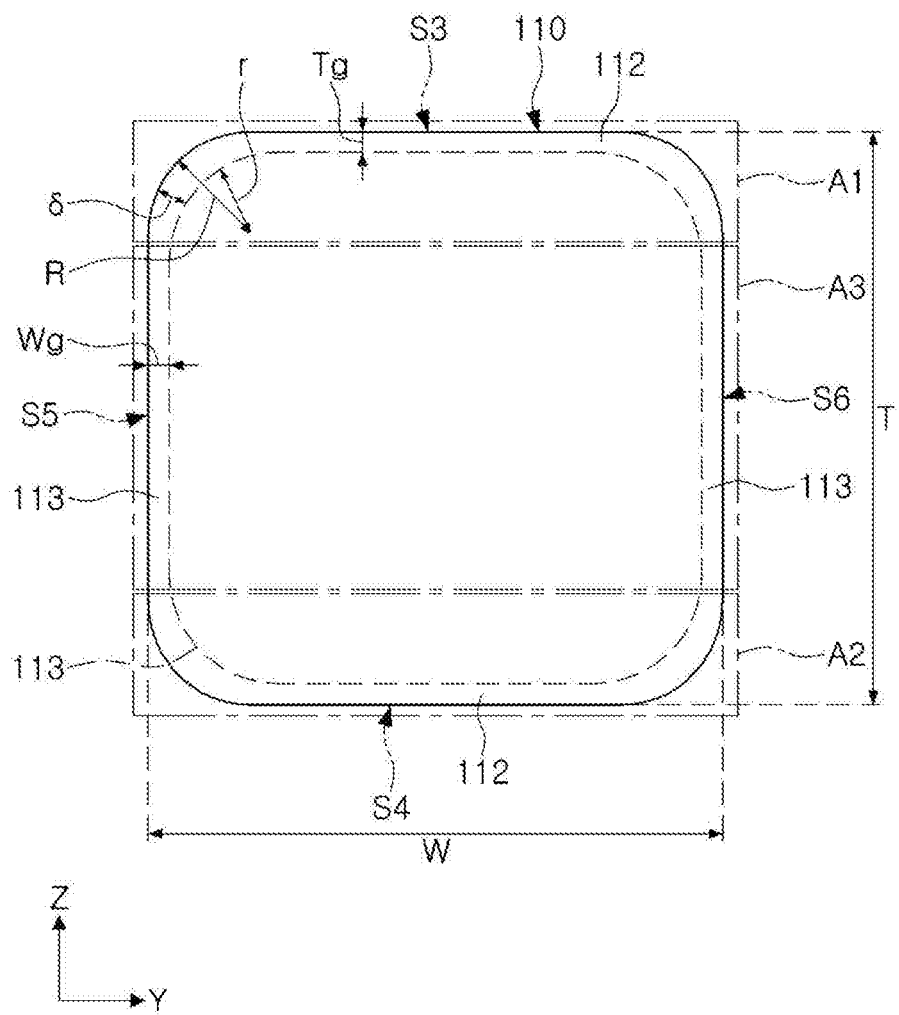

FIG. 1 is a perspective diagram illustrating an exterior of a multilayer capacitor according to an example embodiment. FIGS. 2 and 4 are cross-sectional diagrams illustrating a multilayer capacitor taken along line I-I' in FIG. 1, and in FIG. 4, an outline of a region in which an internal electrode is disposed is marked by a dotted line. FIG. 3 is a cross-sectional diagram illustrating a multilayer capacitor taken along line II-II' in FIG. 1.

Referring to FIGS. 1 to 4, a multilayer capacitor 100 of the example embodiment may include a body 110 including dielectric layers 111 and a plurality of internal electrodes 121 and 122 stacked with the dielectric layers interposed therebetween, and external electrodes 131 and 132, and cover portions A1 and A2 of the body 110 may have curved corners. Also, as illustrated in FIG. 2, a width of the internal electrode disposed in the cover portions A1 and A2 among the plurality of electrodes 121 and 122 may be narrower than a width than a width of the internal electrode disposed in a central portion A3.

The body 110 may have a form in which a plurality of dielectric layers 111 are layered, and may be obtained by layering a plurality of green sheets and sintering the layered green sheets. By the sintering process, the plurality of dielectric layers 111 may have an integrated form. A shape and a size of the body 110, and the number of the plurality of layered dielectric layers 111 may not be limited to an example illustrated in the diagram. For example, as illustrated in FIG. 1, the body 110 may have a form similar to a hexahedron. The body 110 may include a first surface S1 and a second surface S2 exposing the internal electrodes 121 and 122, respectively, a third surface S3 and a fourth surface S4 opposing each other in a stacking direction (Z) of the plurality of dielectric layers 111, and a fifth surface S5 and a sixth surface S6 connected to the first to fourth surfaces S1, S2, S3, and S4 and opposing each other.

The dielectric layer 111 included in the body 110 may include a ceramic material having a high dielectric constant, and may include a BT based material, such as barium titanate (BaTiO$_3$) ceramic, for example. Another well-known material may also be used as along as sufficient capacitance may be obtained. If desired, the dielectric layer 111 may further include additives, organic solvents, plasticizer, coupling agents, dispersing agents, and the like, in addition to the ceramic material, a main element. The additives may include a metal element and may be added in a metal oxide form during a manufacturing process. As an example of the metal oxide additive, at least one of MnO$_2$, Dy$_2$O$_3$, BaO, MgO, Al$_2$O$_3$, SiO$_2$, Cr$_2$O$_3$, and CaCO$_3$ may be included.

The internal electrodes 121 and 122 may be obtained by printing paste including a conductive metal on one surface of a ceramic green sheet in a certain thickness and sintering the paste. In this case, the plurality of internal electrodes 121 and 122 may include the first and second internal electrodes 121 and 122 exposed from the first surface S1 and the second surface S2 of the body 110 opposing each other as in the example illustrated in FIG. 3. In this case, the internal electrodes 121 and 122 may be connected to different external electrodes 131 and 132 such that the internal electrodes 121 and 122 may have different polarities when being driven, and may be electrically isolated from each other by the dielectric layer 111 disposed therebetween. As illustrated in the diagram, the internal electrodes 121 and 122 may have a uniform thickness. The number of the external electrodes 131 and 132 and a method of connecting the external electrodes 131 and 132 to the internal electrodes 121 and 122 may vary in example embodiments. As a main material of the internal electrodes 121 and 122, nickel (Ni), copper (Cu), palladium (Pd), silver (Ag), and the like, or alloys thereof, may be used.

The external electrodes 131 and 132 may be disposed in an external portion of the body 110, and may include the first and second external electrodes 131 and 132 electrically connected to the first and second internal electrodes 121 and 122, respectively. The external electrodes 131 and 132 may be formed by spraying paste manufactured using a material including a conductive metal on the body 110. As an example of a conductive metal, there may be nickel (Ni), copper (Cu), palladium (Pd), gold (Au), or alloys thereof. The external electrodes 131 and 132 may further include a plating layer to mount the multilayer capacitor 100 on a substrate if desired.

In the example embodiment, the corners of the body 110 may be configured to be curved to prevent a chipping defect, and widths of the internal electrodes 121 and 122 disposed in the cover portions A1 and A2 of the body 110 may be configured to be relatively narrow. Structural characteristics of the body 110 in the example embodiment may also be represented differently. For example, when a distance from a surface of the body 110 to the closest internal electrode among the plurality of internal electrodes 121 and 122 is defined as a margin, a margin of the curved corner of the cover portions A1 and A2 may be greater than or the same as a margin of the body 110 taken in a width direction. The configuration will be described later. Also, the structural characteristic of the body 110 in the example embodiment may be represented in another form. A virtual surface obtained by connecting ends of the internal electrodes 121 and 122 disposed in the cover portions A1 and A2 of the body 110 in a stacking direction of the plurality of dielectric layers 111 may be configured to be a curved surface. The configuration will also be described later.

In the example embodiment, optimal examples of a size, a radius of curvature of the curved surface, a thickness, and a length of the margin may be implemented to improve performance. By implementing such a structure, a size of the multilayer capacitor 100 may be reduced, higher level of capacitance may be secured, and moisture resistance reliability may improve. In the description below, the configuration will be described in greater detail.

The body 110 may include a central portion A3 and cover portions A1 and A2. The cover portions A1 and A2 may be positioned in an upper portion and a lower portion of the central portion A3 in a stacking direction (Z direction in the diagram) of the plurality of dielectric layers 111. The internal electrodes 121 and 122 may be disposed in the cover portions A1 and A2 and the central portion A3, and a width of each of internal electrodes disposed in the cover portions A1 and A2 may be narrower than a width of an internal electrode disposed in the central portion A3. In this case, as illustrated in the diagram, among the plurality of internal electrodes 121 and 122, the closer the internal electrodes disposed in the cover portions A1 and A2 to a surface of the body 110, the narrower the width the internal electrodes may have. A width of each of the internal electrodes 121 and 122 may be defined as a width taken in a direction perpendicular to a direction (X direction) connecting the first surface S1 and the second surface S2 and to a stacking direction (Z direction) of the plurality of dielectric layers 111, which is a width taken in a Y direction.

As described above, the corners of the cover portions A1 and A2 of the body 110 may be configured to be curved, and the curved corners may reduce a chipping defect of the multilayer capacitor 100, and may resolve other issues. For example, the corners (the curved corners in an upper portion in FIG. 2) of the cover portions A1 and A2 at which the third surface S3 is connected to the fifth surface S5 and the sixth surface S6, and the corners (the curved corners in a lower portion in FIG. 2) at which the fourth surface S4 is connected to the fifth surface S5 and the sixth surface S6 may be configured to be curved.

Example optimal conditions of a size, a radius of curvature of the curved surface, a thickness, and a length of the margin in the body 110 will be described with reference to FIG. 4. In FIG. 4, a region in which the internal electrodes are disposed may be defined as an internal electrode region 120 and is marked by a dotted line. In this case, a Z direction is defined as a direction of a thickness of the body 110, and a Y direction is defined as a direction of a width of the body 110, thereby defining a thickness T and a width W of the body 110.

A margin of the body 110 may be defined as a distance from a surface to the closest internal electrode among the plurality of internal electrodes. For example, a margin of each of the curved corners of the cover portions A1 and A2 may be δ. A margin of each of the fifth surface S5 and the sixth surface S6 may be Wg, which may be a margin taken in a width direction of the body 110. In the example embodiment, the margin δ of the curved corner may be configured to be greater than or equal to the margin Wg taken in a width direction. In a general multilayer capacitor, it may be difficult to form a width direction margin as the internal electrodes are not aligned. To address the issue, a process for forming a width direction margin may be used. In such a structure, however, it may be difficult to sufficiently secure a margin δ of the curved corner of the body 110, and when a size of the body 110 is reduced, and the number of stacked internal electrodes is increased, moisture resistance reliability may degrade.

In the example embodiment, overall widths of the internal electrodes 121 and 122 disposed in the cover portions A1 and A2 may be adjusted such that the internal electrodes 121 and 122 may have a form corresponding to the curved corners of the body 110. Accordingly, a margin δ of the curved corner may be sufficiently secured, and the margin δ may be greater than or the same as the margin Wg taken in a width direction. The margin δ of the curved corner and the width direction margin Wg may satisfy a condition of 1≤δ/Wg≤1.2. When the margin δ of the curved corner exceeds 1.2 times of the width direction margin Wg, widths of the internal electrodes 121 and 122 in the cover portions A1 and A2 may excessively decrease such that capacitance may decrease.

As the margin δ of the curved corner increases, moisture resistance reliability may improve in the body 110 having a reduced size, and the body 110 may implement improved capacitance by including the plurality of internal electrodes 121 and 122. The improved capacitance may refer to capacitance measured with reference to the same volume of the body 110, which is an increased effective volume.

In the example embodiment, the internal electrodes 121 and 122 disposed in the central portion A3 may have a uniform width, which may be obtained by a process of cutting a ceramic stack body into individual chips. The uniformity of the thickness may be determined based on positions of ends of the internal electrodes 121 and 122. For example, a deviation between positions of ends of the internal electrodes 121 and 122 may be equal to or less than 0.1 um in the width direction (Y direction).

A margin taken in a thickness direction of the body 110, a margin Tg and a width direction margin Wg of each of the third surface S3 and the fourth surface S4, may satisfy a condition of 0.8≤Tg/Wg≤1.2. The thickness direction margin Tg and the width direction margin Wg may be formed through the same process, and may thus have similar sizes. When the dielectric layer 111, a base layer used as a cover, is formed in uppermost and lowermost internal electrodes 121 and 122, the thickness direction margin Tg may be slightly greater than the width direction margin Wg, but Tg/Wg may not exceed 1.2.

The width direction margin Wg may satisfy a condition of 0.5 um≤Wg≤15 um, which may be configured to secure moisture resistance reliability and sufficient capacitance. Similarly, the thickness direction margin Tg may also satisfy the condition of 0.5 um≤Wg≤15 um. The width direction margin Wg may be determined in consideration of the thickness T of the body 110, and may satisfy a condition of 0.5 um≤Wg≤T/12. The thickness T of the body 110 may be 200 to 400 um.

The radius of curvature R of each of the curved corner of the cover portions A1 and A2 may be configured to endure chipping impacts caused by a weight of the multilayer capacitor 100 and load occurring during processes. The radius of curvature R may satisfy a condition of 10 um≤R≤60 um. The radius of curvature R may be determined in consideration of a thickness T of the body 110, and may satisfy a condition of 10 um≤R≤T/4. As described above, the thickness T of the body 110 may be 200 to 400 um. In this case, a curved region of the internal electrode region 120 of the cover portions A1 and A2 may have substantially the same curved form as the form of the corners of the body 110, substantially the same radius of curvature, and the curved region of the internal electrode region 120 may be a virtual surface obtained by connecting ends of the internal electrodes 121 and 122 disposed in the cover portions A1 and A2 in a stacking direction. As illustrated in the diagram, the virtual surface of the internal electrode region 120 and the curved corners of the cover portions A1 and A2 may oppose each other.

As illustrated in FIG. 4, the virtual surface obtained by connecting ends of the internal electrodes 121 and 122 disposed in the cover portions A1 and A2 in a stacking direction may have a radius of curvature r less than a radius of curvature R of each of the curved corners of the cover portions A1 and A2. In this case, the radius of curvatures r and R may share the same center.

The radius of curvature R of each of the curved corners of the cover portions A1 and A2 may be the same as a sum of the radius of curvature r of the virtual surface and a margin δ of the curved corner of the cover portions A1 and A2.

When an outer region of the body 110 surrounding the plurality of internal electrodes 121 and 122, a region surrounding the internal electrode region 120 in FIG. 4, is defined as margin regions 112 and 113, density of the dielectric layer 111 in the margin regions 112 and 113 may be less than density of the dielectric layer 111 in a remaining region. The margin regions 112 and 113 may be obtained by, after manufacturing a ceramic stack body, coating the ceramic stack body, and other processes, and the difference in density may be caused by different manufacturing methods. The density may be inversely proportional to density of pores present in the dielectric layer 111.

An example of a method of manufacturing the multilayer capacitor described above will be described with reference to FIGS. 5 to 14.

Figure 5:
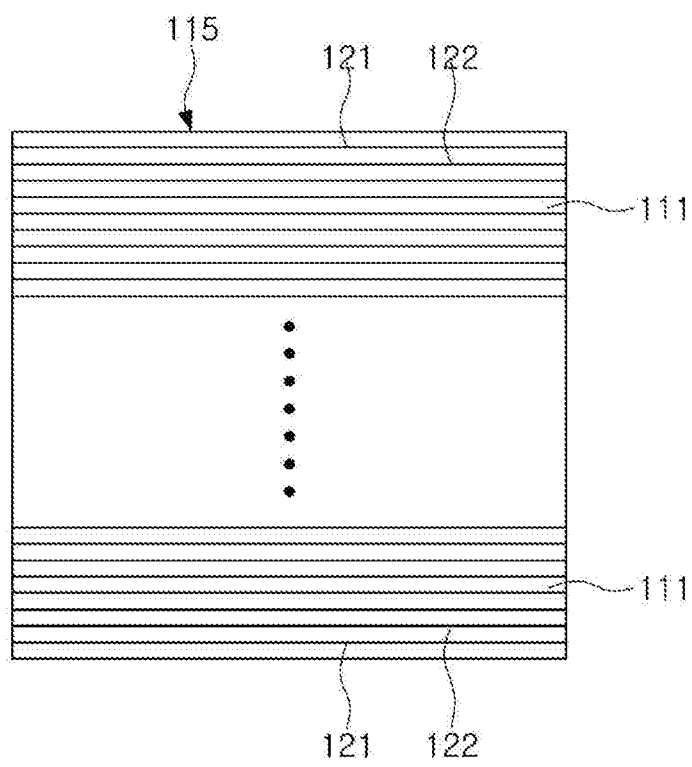
FIGS. 5 to 14 are processes for manufacturing a multilayer capacitor according to an example embodiment of the present disclosure.
Figure 5:
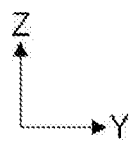

As illustrated in FIG. 5, a ceramic stack body 115 may be prepared by layering dielectric layers 111 and internal electrodes 121 and 122. As the dielectric layer 111 is not yet sintered, the dielectric layer 111 may be a ceramic green sheet state. The ceramic green sheet may be obtained by manufacturing a sheet having a thickness of several μm from slurry, manufactured from a mixture of ceramic powder, binder, solvent, and the like, using a doctor blade method. The ceramic green sheet may be sintered, and the dielectric layer 111 may be formed.

Conductive paste for an internal electrode may be sprayed on the ceramic green sheet, and an internal electrode pattern may be formed. The internal electrode pattern may be formed by a screen printing method of a gravure printing method. The conductive paste for an internal electrode may include a conductive metal and additives, and the additives may be one or more of a non-metal oxide and a metal oxide. The conductive metal may include nickel. The additive may include barium titanate or strontium titanate.

A plurality of the ceramic green sheets on each of which an internal electrode pattern is formed may be layered, and the layered ceramic green sheets may be compressed, thereby implementing the ceramic stack body 115. The ceramic stack body 115 may include the dielectric layer 111 as a base layer used for a cover disposed in an uppermost portion and a lowermost portion, and may thus effectively protect the internal electrodes 121 and 122 using the dielectric layer. Alternatively, the dielectric layer 111 may not be disposed in an uppermost portion and a lowermost portion of the ceramic stack body 115.

After the ceramic stack body 115 is formed, the ceramic stack body 115 may be cut into individual chip units if desired. In this case, the internal electrodes 121 and 122 may be configured to be exposed to be connected to external electrodes 131 and 132. The internal electrodes 121 and 122 exposed by the cutting process may have a uniform width. For example, a difference between the greatest width and the smallest width of the internal electrodes 121 and 122 may be less than 0.1 um.

Figure 6:
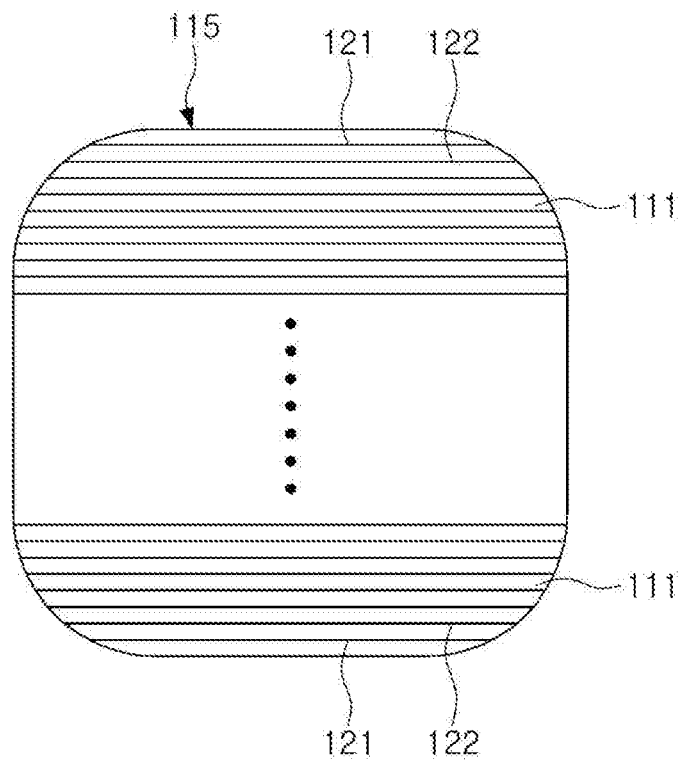
Figure 7:
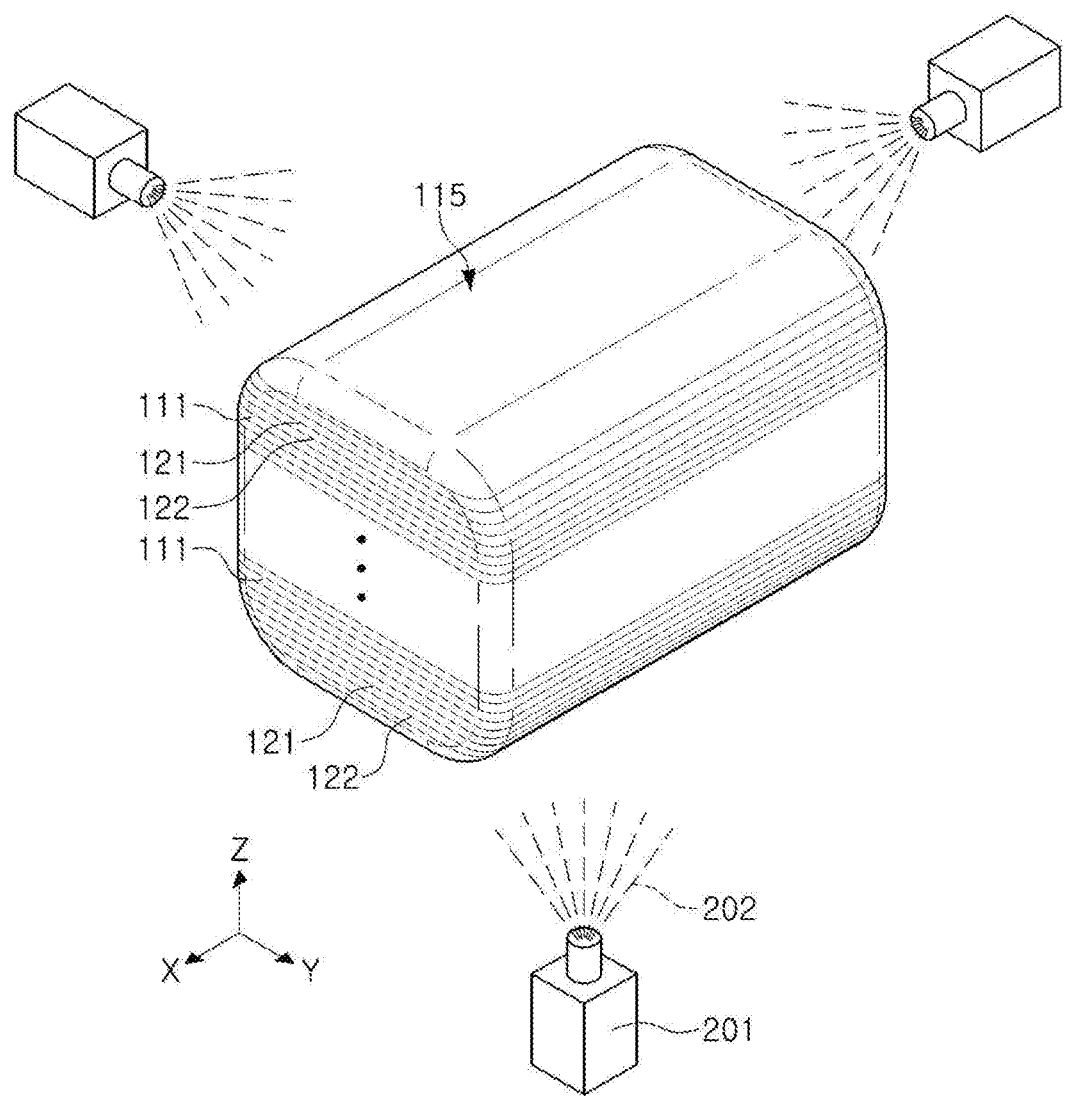
Figure 8:
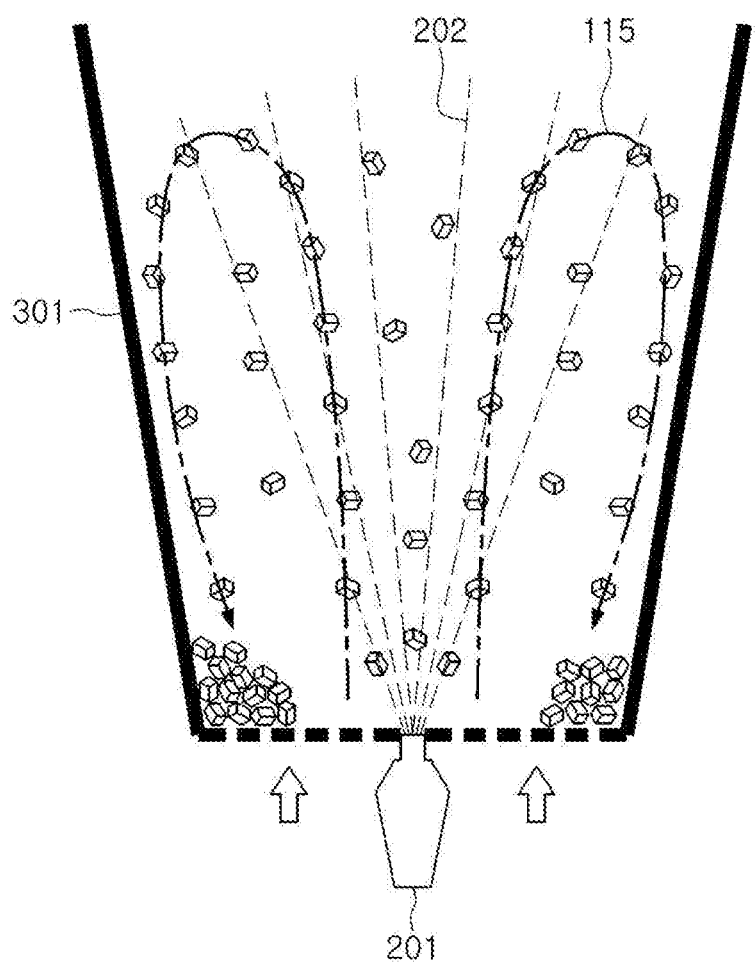
Figure 9:
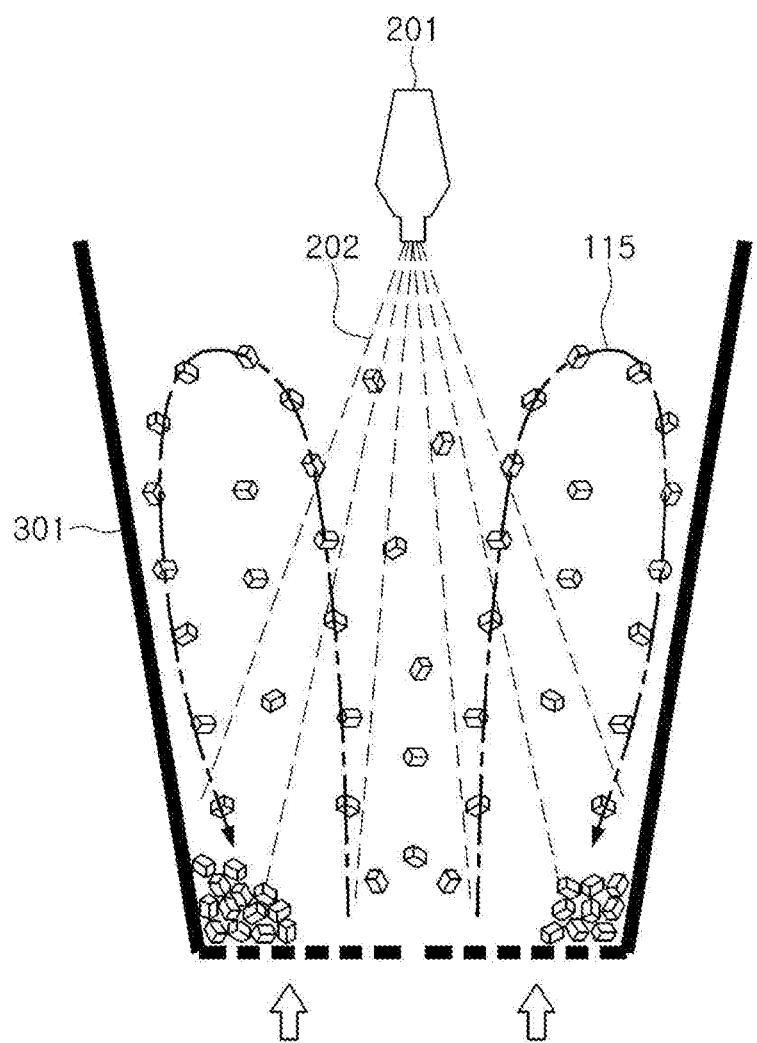

As illustrated in FIG. 6, corners of the ceramic stack body 115 may be ground to be curved. In the process, the ceramic stack body 115 may also be ground to expose the internal electrodes 121 and 122 disposed in an uppermost portion and a lowermost portion (the cover portions of the body described above) from the ceramic stack body 115. By the grinding process, each internal electrode disposed in the cover portions of the body among the plurality of internal electrodes 121 and 122 may have a width narrower than a width of the internal electrode disposed in the central portion. As the process of grinding the corners of the ceramic stack body 115, a barrel grinding process, and the like, may be used.

A coating layer 118 (in FIG. 11) may be formed on a surface of the ceramic stack body 115 by performing an appropriate coating process. In the example embodiment, a method of spray-coating the surface with ceramic slurry 202 using a spraying device 201 as illustrated in the example in FIG. 7. In this case, the ceramic slurry 202 may include the same elements as those of the green sheet for forming the dielectric layer 111, or may further include an element for endowing liquidity to the green sheet, such as liquid binder, and the like, for example. As an example of the coating process, as illustrated in the examples in FIGS. 8 and 9, the ceramic stack body 115 may be disposed in a coating device 301, and an air flow may be generated towards an upper portion from a lower portion (an arrow in FIGS. 8 and 9). After the ceramic stack body 115 floats, the ceramic slurry 202 may be sprayed through a nozzle of the spraying device 201 disposed in a lower portion (in FIG. 8) or in an upper portion (in FIG. 9). Differently from the example in the diagrams, the spraying device 201 may also be disposed in a side portion of the coating device 301.

By the coating method, a coating layer 118 having a uniform thickness may be formed on a surface of the ceramic stack body 115. By forming the coating layer 118 separately after manufacturing the ceramic stack body 115, a margin region having a uniform and thin thickness may be formed, and a margin having a sufficient thickness may be obtained in the corner regions of the body which may be vulnerable to moisture. Also, as the coating layer 118 is formed along a surface of the ceramic stack body 115, curved corners may be naturally implemented, and in this case, an additional process for forming curved corners may be omitted. Accordingly, the curved corners of the coating layer 118 and the curved corners of the ceramic stack body 115 may be configured to be oppose each other, and may have the same radius of curvature.

Figure 10:
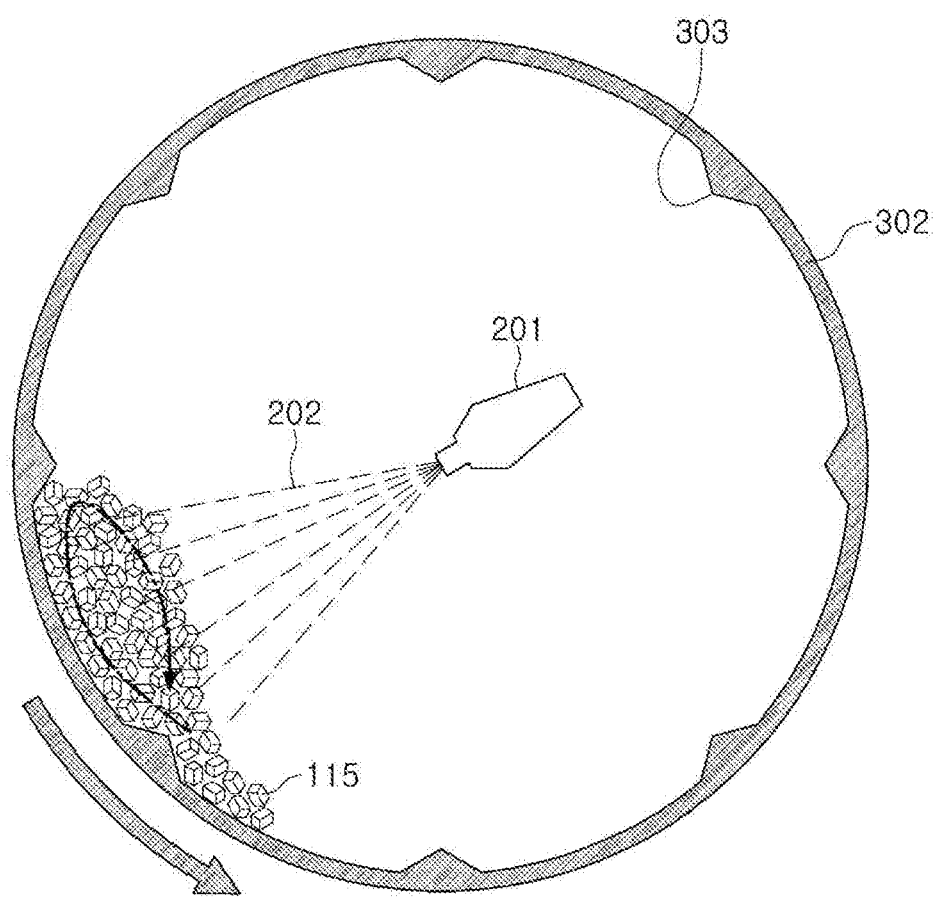

As another coating method, as illustrated in the example in FIG. 10, a coating device 302 having a spherical-shaped container may be used. In this case, a protrusion 303 may be formed in the coating device 302. When the coating device 302 rotates, the ceramic stack body 115 may turn over and move such that the ceramic stack body 115 may be uniformly coated.

Figure 11:
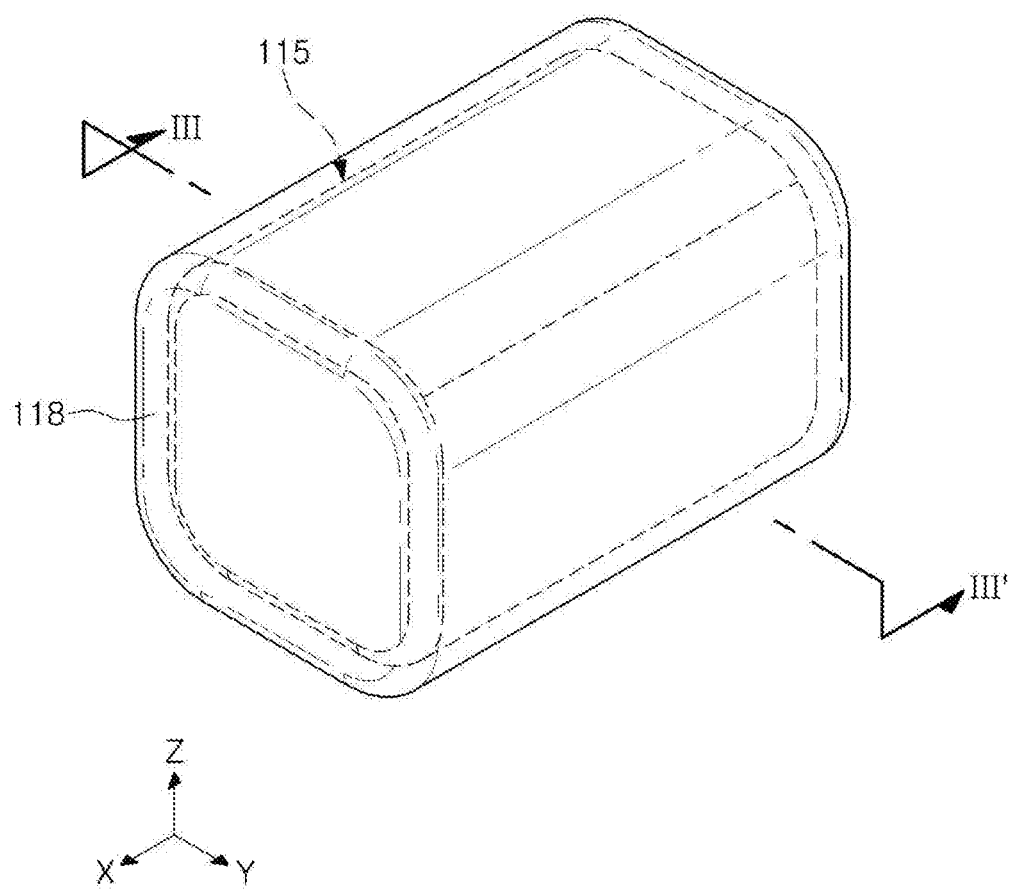
Figure 12:
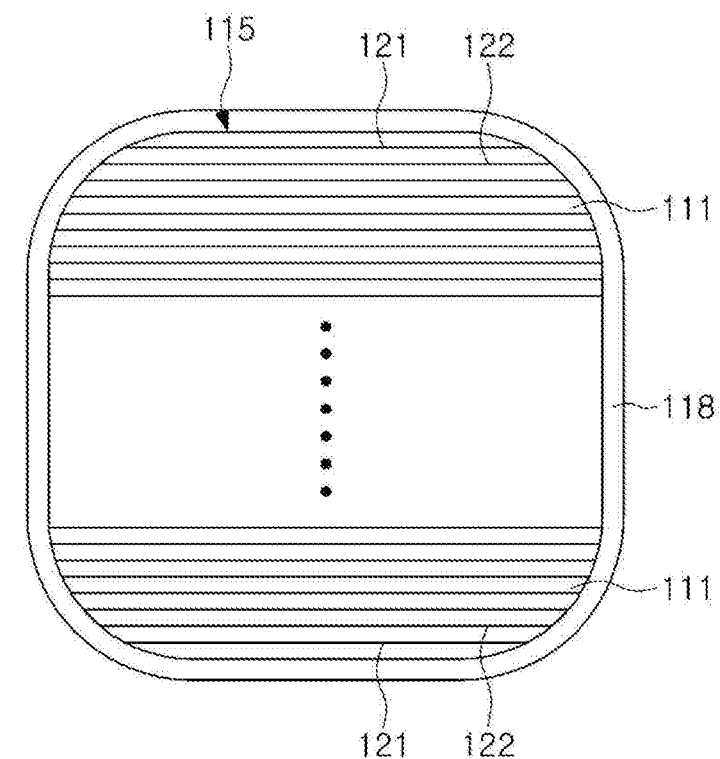

FIG. 11 is a diagram illustrating a state in which a coating layer 118 is formed on an overall surface of a ceramic stack body 115, and FIG. 12 is a cross-sectional diagram taken along line III-III' in FIG. 11. As illustrated in the diagram, by performing the above-described coating process, the coating layer 118 may have curved corners. The ceramic stack body 115 may be sintered while the coating layer 118 is applied. Accordingly, the green sheets and the coating layer 118 included in the ceramic stack body 115 may be configured to be an integrated body.

Figure 13:
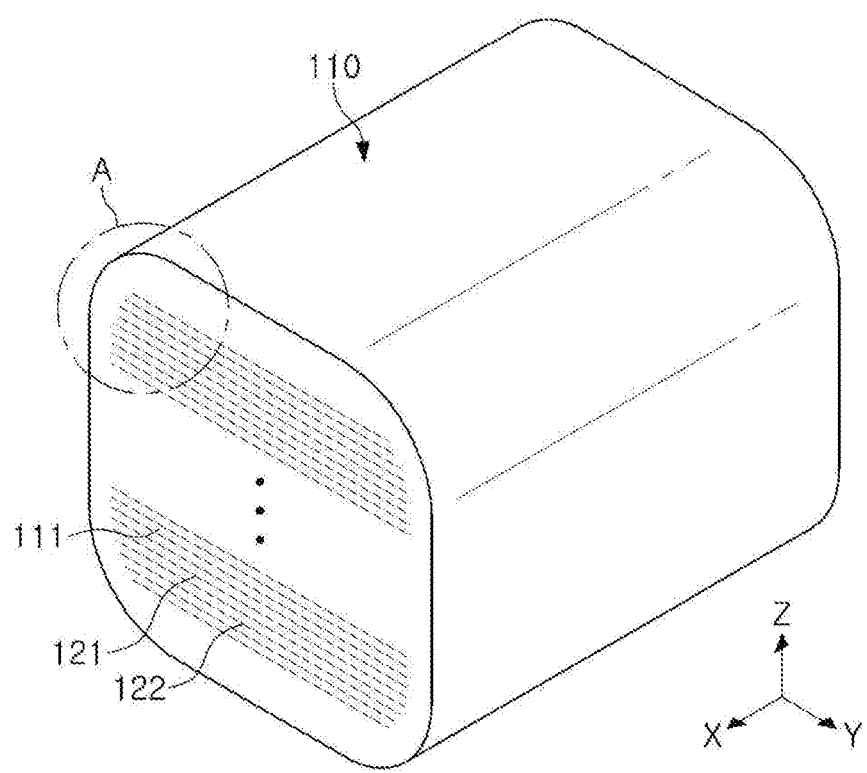

After the sintering process, a portion of the body 110 may be removed to expose the internal electrodes 121 and 122. The surfaces from which the internal electrodes 121 and 122 are exposed may be the first surface S1 and the second surface S2, and if desired, the internal electrodes 121 and 122 may be exposed from the other surfaces. As the surface grinding process for removing a portion of the body 110, a polishing process, a grinding process, and the like, may be used. FIG. 13 is a diagram illustrating an example of the body 110 after the sintering process and the grinding process, and examples of the internal electrodes 121 and 122 exposed from the body 110. Thereafter, external electrodes 131 and 132 connected to the internal electrodes 121 and 122 may be formed.

Figure 14:
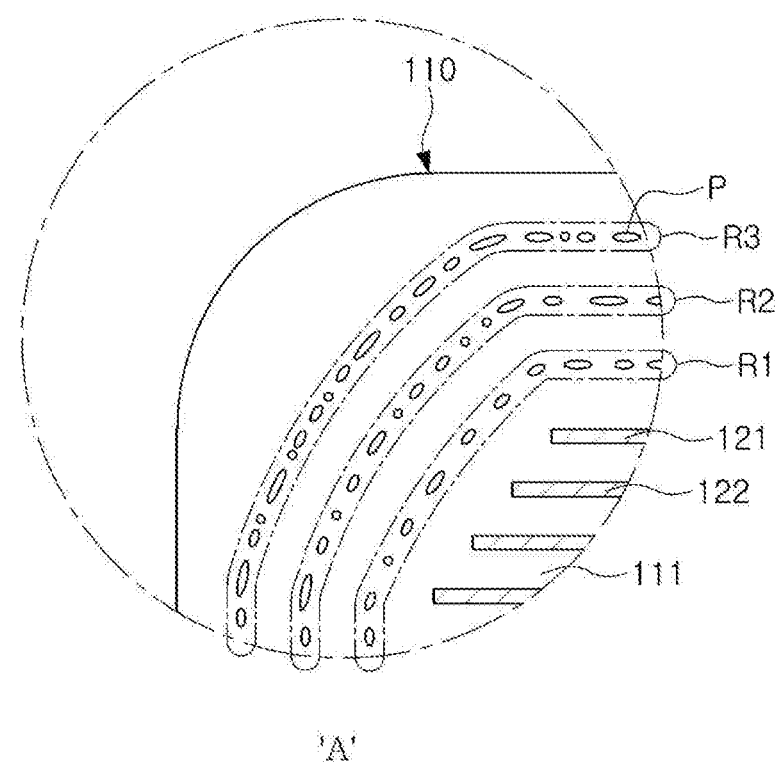

In the above-described process, as the dielectric layer 111 is formed by a ceramic green sheet, and the margin region may be formed by the coating process by spraying ceramic slurry, there may be a difference in internal structures thereof after the sintering process. In other words, characteristics, such as density, in the internal electrode region 120 and in the margin regions 112 and 113 may be different from each other. The example configuration will be described with reference to FIG. 14. FIG. 14 is an enlarged plan diagram illustrating region A illustrated in FIG. 13.

Comparing density of the dielectric layer 111 in the margin region of the body 110 with density of the dielectric layer 111 in the other region (the internal electrode region), density of the dielectric layer 111 is relatively lower in the margin regions 112 and 113. Also, density of the dielectric layer 111 in a region of the margin regions 112 and 113 closer to the internal electrodes 121 and 122 may be higher than density of the dielectric layer 111 in a region closer to an external portion of the body 110. Thus, the margin regions 112 and 113 may include at least two layers including different densities of the dielectric layers 111, and among the at least two layers, density of the dielectric layer 111 may be higher in a layer adjacent to the plurality of internal electrodes 121 and 122.

The density characteristic of the margin regions 112 and 113 may be obtained through the above-described coating process. When the ceramic slurry is sprayed, multiple thin coating layers may be formed and layered on a surface of the ceramic stack body 115, and a plurality of pores may be formed between the coating layers. The pores may remain even after the sintering process. As illustrated in FIG. 14, a plurality of needle-type pores P may remain in the margin regions 112 and 113 of the body 110. As the plurality of needle-type pores P are created in the process of forming the multiple thin coating layers, a plurality of rows R1, R2, and R3 formed by the pores may be configured to be aligned to correspond to an exterior shape of the body 110. The plurality of rows R1, R2, and R3 formed by the needle-type pores P may have different pore densities, and as a region closer to a surface of the body 110 is coated later than the other region, the region may have lower pore density.

According to the aforementioned example embodiments, the multilayer capacitor may have a reduced size and high capacitance, and may have improved reliability as moisture resistance reliability improves.

While the exemplary embodiments have been shown and described above, it will be apparent to those skilled in the art that modifications and variations could be made without departing from the scope of the present invention as defined by the appended claims.

What is claimed is:
1. A multilayer capacitor, comprising:
   a body including a stack structure of a plurality of dielectric layers, and a plurality of internal electrodes stacked with each of the plurality of dielectric layers interposed therebetween; and external electrodes disposed in an external portion of the body and electrically connected to the plurality of internal electrodes, wherein the body includes a central portion, and cover portions positioned in an upper portion and a lower portion of the central portion in a stacking direction of the plurality of the dielectric layers, wherein at least some corners of the cover portions of the body have curved surfaces, wherein a length of each of internal electrodes disposed in the cover portions among the plurality of internal electrodes is smaller than a length of an internal electrode disposed in the central portion, wherein, when an outer region of the body surrounding the plurality of internal electrodes is defined as a margin region, a portion of the margin region, located directly above or below the internal electrodes disposed in the cover portions in the stacking direction, includes at least two layers including different densities of dielectric layers, wherein density of a dielectric layer is higher in a layer adjacent to the plurality of internal electrodes among the at least two layers of said portion of the margin region, and wherein the at least two layers of said portion of the margin region include a plurality of needle-type pores.

2. The multilayer capacitor of claim 1, wherein the body includes a first surface and a second surface exposing the plurality of internal electrodes and opposing each other, a third surface and a fourth surface opposing each other in the stacking direction, and a fifth surface and a sixth surface connected to the first to fourth surfaces and opposing each other, and wherein, among the internal electrodes of the plurality of internal electrodes disposed in the cover portions, a length of an internal electrode closer to the third or fourth surface of the body is smaller than a length of an internal electrode farther from the third or fourth surface.

3. The multilayer capacitor of claim 1, wherein the body includes a first surface and a second surface exposing the plurality of internal electrodes and opposing each other, a third surface and a fourth surface opposing each other in the stacking direction, and a fifth surface and a sixth surface connected to the first to fourth surfaces and opposing each other, and wherein a length of each of the plurality of internal electrodes is a length taken in a direction perpendicular to a direction connecting the first surface and the second surface and to the stacking direction.

4. The multilayer capacitor of claim 1, wherein the body includes a first surface and a second surface exposing the plurality of internal electrodes and opposing each other, a third surface and a fourth surface opposing each other in the stacking direction, and a fifth surface and a sixth surface connected to the first to fourth surfaces and opposing each other, and wherein corners of the cover portions at which the third surface is connected to the fifth surface and the sixth surface and corners at which the fourth surface is connected to the fifth surface and the sixth surface include curved surfaces.

5. The multilayer capacitor of claim 4, wherein a margin, $\delta$, of each of the curved corners of the cover portions is greater than or equal to a margin, Wg, of each of the fifth surface and the sixth surface, where a distance from a surface of the body to a closest internal electrode among the plurality of internal electrodes is defined as a margin.

6. The multilayer capacitor of claim 5, wherein $\delta$ and Wg satisfy a condition of $1 \le \delta/Wg \le 1.2$.

7. The multilayer capacitor of claim 5, wherein Wg satisfies a condition of $0.5\ \mu m \le Wg \le T/12$, where T refers to a thickness of the body in the stacking direction.

8. The multilayer capacitor of claim 1, wherein a radius of curvature, R, of each of the curved corners of the cover portions and a thickness, T, of the body in the stacking direction satisfy a condition of $10\ \mu m \le R \le T/4$.

9. The multilayer capacitor of claim 1, wherein a virtual surface defined by connecting ends of the plurality of internal electrodes disposed in the cover portions of the body in the stacking direction is a curved surface, and a radius of curvature of the curved surface is the same as a radius of curvature of each of the curved corners of the cover portions.

10. The multilayer capacitor of claim 1, wherein a virtual surface defined by connecting ends of the plurality of internal electrodes disposed in the cover portions of the body in the stacking direction is a curved surface, and a radius of curvature of the curved surface is less than a radius of curvature of each of the curved corners of the cover portions.

11. The multilayer capacitor of claim 10, wherein, when a distance from a surface of the body to a closest internal electrode among the plurality of internal electrodes is defined as a margin, a radius of curvature of each of the curved corners of the cover portions is a sum of a radius of curvature of the virtual surface and a margin, $\delta$, of each of the curved corners of the cover portions.

12. The multilayer capacitor of claim 1, wherein density of dielectric layers in the margin region is less than density of dielectric layers in a remaining region of the body.

13. The multilayer capacitor of claim 1, wherein the plurality of needle-type pores are aligned in a shape corresponding to an exterior shape of the body.

14. The multilayer capacitor of claim 13, wherein the plurality of needle-type pores are composed of a plurality of rows when each row is defined as a row of needle-type pores that are aligned in the shape corresponding to the exterior shape of the body.

15. The multilayer capacitor of claim 14, wherein pore densities of the plurality of rows are different from one another, and a pore density of a region closer to an outer surface of the body is greater than pore densities of other regions in the plurality of rows.

16. The multilayer capacitor of claim 1, wherein density of a dielectric layer is higher in a layer adjacent to the internal electrodes disposed in the cover portions among the at least two layers of said portion of the margin region.

17. The multilayer capacitor of claim 1, wherein the body includes a first surface and a second surface exposing the plurality of internal electrodes and opposing each other, a third surface and a fourth surface opposing each other in the stacking direction, and a fifth surface and a sixth surface connected to the first to fourth surfaces and opposing each other, and wherein, when a distance from a surface of the body to a closest internal electrode among the plurality of internal electrodes is defined as a margin, a margin, Wg, of each of the fifth surface and the sixth surface and a margin, Tg, of each of the third surface and the fourth surface satisfy a condition of $0.8 \le Tg/Wg \le 1.2$.

18. A multilayer capacitor, comprising:

a body including a stack structure of a plurality of dielectric layers, and a plurality of internal electrodes stacked with each of the plurality of dielectric layers interposed therebetween; and external electrodes disposed in an external portion of the body and electrically connected to the plurality of internal electrodes, wherein the body includes a central portion, and cover portions positioned in an upper portion and a lower portion of the central portion in a stacking direction of the plurality of the dielectric layers, wherein at least some corners of the cover portions of the body have curved surfaces, wherein a length of each of internal electrodes disposed in the cover portions among the plurality of internal electrodes is smaller than a length of an internal electrode disposed in the central portion, wherein, when an outer region of the body surrounding the plurality of internal electrodes is defined as a margin region, a first portion of the margin region is defined as a region located directly above or below the internal electrodes disposed in the cover portions in the stacking direction, and a second portion of the margin region is defined as a region located outside the internal electrodes disposed in the central portion, each of the first and second portions of the margin region includes a plurality of rows having different densities of dielectric layers from one another.

19. The multilayer capacitor of claim 18, wherein each of the plurality of rows includes a plurality of pores, and
a pore density of a region closer to an outer surface of the body is greater than pore densities of other regions in the plurality of rows.

20. The multilayer capacitor of claim 18, wherein each of the plurality of rows includes needle-type pores that are aligned in a shape corresponding to an exterior shape of the body.

* * * * *